Nov. 2, 1948.   D. L. WEEKS   2,452,618
SNUBBING DEVICE FOR CATAPULTS
Filed April 10, 1946
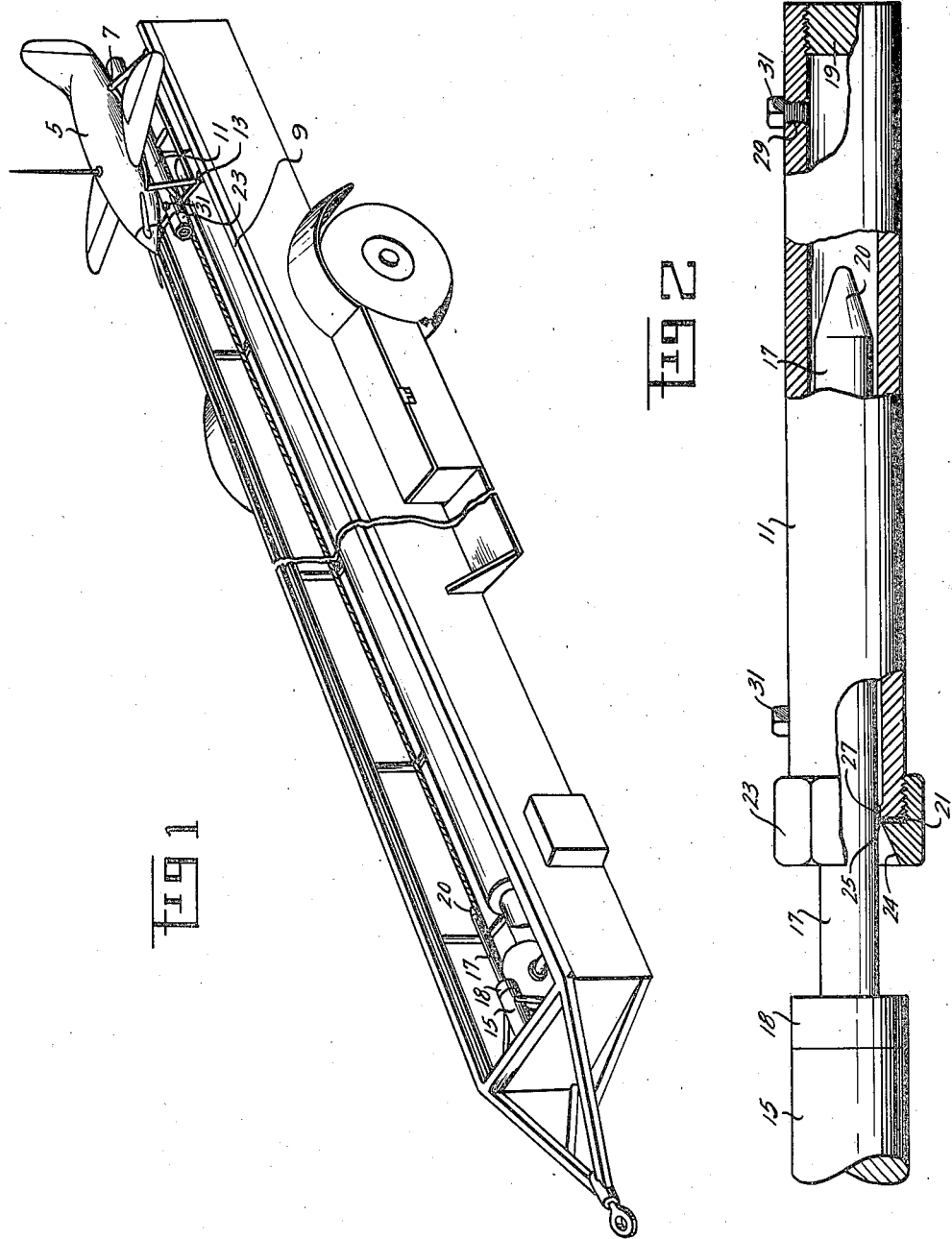
INVENTOR.
DAVID L. WEEKS
BY
HIS ATTORNEYS Patented Nov. 2, 1948

2,452,618

UNITED STATES PATENT OFFICE 2,452,618

SNUBBING DEVICE FOR CATAPULTS

David L. Weeks, Berkeley, Calif.

Application April 10, 1946, Serial No. 661,039

5 Claims. (Cl. 244—63)

(Granted under the act of March 3, 1883, as amended April 30, 1928; 370 O. G. 757)

The invention described herein may be manufactured and used by or for the Government for governmental purposes without payment to me of any royalty thereon.

This invention relates to a snubbing device and more particularly to a snubbing device for catapults.

At the present time a rubber shock cord system is used in target aircraft catapult apparatus to stop the catapult launching car at the end of the catapult track. This system causes the car to rebound and the rubber used deteriorates quickly and must be replaced. When a self-contained hydraulic device is used in aircraft catapult apparatus to stop the car, the sharp deceleration causes hammer blows on the mechanism and the parts often get out of order and must be repaired.

This invention is devised to stop the launching car at the end of the catapult track in the required distance by absorbing all of the energy of the catapult launching car and thus eliminating any hammer blows or stress on the mechanism due to quick stopping. This snubbing device likewise is simple and inexpensive to construct and operate and has no mechanically interconnected parts to get out of order.

It is therefore an object of this invention to provide a snubbing device in which a piston and fluid-filled cylinder are mounted separately from each other with no mechanical connection and which makes use of the jet effect of the fluid as it is forced out of an orifice in the cylinder under high velocity.

It is a further object of this invention to provide on a movable catapult launching car a fluid-filled cylinder having a frangible diaphragm on the end thereof which closes an orifice therein through which water is forced under great pressure and at a high velocity when the cylinder is penetrated by a piston mounted stationary at the end of the catapult track.

It is a still further object of this invention to provide a catapult apparatus snubbing device comprising a fluid-filled cylinder mounted on the catapult launching car which has a frangible seal at one end thereof closing an orifice therein. Said frangible seal is penetrated by a rod-shaped piston mounted stationary at the end of the catapult track having its free end tapered to substantially a point. When said piston enters said orifice, it forces the fluid in the cylinder out of said orifice, which is bounded by a portion of the inner wall of said cylinder and the surface of said piston, under gradually increasing pressure and velocity due to the taper on the free end of said piston, thereby snubbing the launching car gradually in the required distance.

These and other objects of my invention will become apparent from the following description taken in conjunction with the accompanying drawing in which:

Fig. 1 is a perspective view of a standard catapult launching system with the snubbing device attached.

Fig. 2 is a side view of the snubbing device, partially in section.

Referring to Fig. 1, it will be seen that an airborne member 5, such as a target airplane, guided missile, airplane, etc., is mounted on a launching car 7. Launching car 7 is in turn mounted on a catapult track 9 down which launching car 7 is accelerated when the airborne member 5 is to be catapulted into the air.

A fluid-filled cylinder 11 is provided on the catapult launching car 7. The cylinder 11 can be positioned in many ways on the launching car 7, but it is shown here as the main structural member of the launching car, mounted above launching car wheels 13 and below airborne member 5. A piston 17 has one end thereof securely attached to a mounting member 15 which is mounted stationary at the end of catapult track 9. An annular ring rubber cushion 18 fits around piston 17 and abuts against the forward end of mounting member 15. Piston 17 is rod shaped and its diameter is governed by the inside diameter of the cylinder 11 which it must penetrate. The free end of piston 17 is tapered to a smaller diameter than the rest of piston 17 forming a generally pointed end 20. Piston 17 is mounted in such a position as to be able to pierce or displace a frangible diaphragm 21, which seals the front end of cylinder 11, when the launching car 7 moves down track 9 and contacts piston 17. Diaphragm 21 is made of Celluloid or some other frangible, water-proof material. An internally threaded cap 23 is screwed over the front end of cylinder 11 to hold diaphragm 21 in place. Cap 23 is provided with a tapered aperture 24 which is larger at the open end and tapered down to the inside diameter of the cylinder 11. The rear end of cylinder 11 is sealed by an externally threaded plug 19.

An orifice 25 is provided in the front end of cylinder 11 through which the fluid in cylinder 11 is forced out when piston 17 penetrates diaphragm 21 and enters the cylinder. Orifice 25 is bounded by a section 27 of the inside wall of cylinder 11, which is reduced to a smaller diameter than the rest of the cylinder wall, and the surface of piston 17 fits closely therein after it has entered cylinder 11. The diameter of the wall portion 27 depends on the rate of deceleration desired in halting the launching car 7. Generally, this diameter will be only a few thousandths larger than the diameter of the piston 17. For example, the diameter of wall section 27 should be 2.000 inches when the diameter of piston 17 is 1.886 inches. Likewise, the angle of taper on the free end of piston 17 is designed to provide the desired rate of deceleration of launching car 7 by building up the pressure and velocity of the fluid passing through orifice 25 gradually as the diameter of piston 17 increases over the length of the taper.

Internally threaded filling vents 29 are provided on cylinder 11 through which cylinder 11 is filled with fluid. Threaded filling vent plugs 31 are provided to seal the vents 29 after the cylinder has been filled.

In operation, airborne member 5 is mounted on launching car 7 which is accelerated down catapult track 9. When cylinder 11 on launching car 7 reaches piston 17, which is mounted stationary at the end of catapult track 9, piston 17 is guided into cylinder 11 by the tapered aperture 24 in cap 23 whereupon it strikes the frangible seal 21, breaks it, and enters the orifice 25 and cylinder 11. When piston 17 enters cylinder 11, it forces the fluid out of orifice 25 under great pressure and at a high velocity, converting the energy of launching car 7 into heat which is dissipated after leaving the orifice 25, thus stopping the forward motion of launching car 7. At the time the piston 17 enters cylinder 11, the airborne member 5 detaches itself from the launching car 7 and is airborne.

When the snubbing device is to be used again, it is merely necessary to unscrew cap 23 and place a new diaphragm 21 in the front end of cylinder 11. The cap 23 is then replaced and the filler plugs 31 removed. Cylinder 11 is then refilled through the filling vents 29 and the plugs 31 are replaced. The snubbing device is then ready to be used again.

The size of the cylinder 11 and the piston 17 is variable, depending on the size of the catapult system and the size of the launching car to be stopped. For example, a piston 1.88 inches in diameter can easily stop a 140 pound launching car travelling at a velocity of 65 miles an hour in 25 inches.

It will thus be seen that I have provided a snubbing device for catapults which is simple to operate, inexpensive to construct and which eliminates any hard blows on the mechanism while stopping the launching car in a desired distance.

While I have described one particular embodiment of my invention, it will be understood that I do not wish to be restricted thereto, and that I intend to cover all modifications thereof which would be apparent to one skilled in the art and which come within the spirit and scope of the appended claims.

I claim:

1. A snubbing device for use in a catapult apparatus, said snubbing device comprising, in combination, a fluid-filled cylinder having a fluid escape orifice at one end thereof, a frangible seal for said orifice, a piston in axial alignment with said orifice and adapted upon relative movement of said cylinder and piston toward each other to pierce said seal and enter said orifice and cylinder, whereby said fluid is forced past said piston and out of said orifice under high pressure, thus arresting said relative movement.

2. In a catapult apparatus including a launching car member and a track member for the car, a snubbing device comprising a fluid-filled cylinder mounted on one of said members and having a seal closing an open end thereof, a piston mounted on the other of said members and having a free end extending toward said seal and adapted to displace said seal when said car member reaches a predetermined point on said track member, continued movement of said car member acting to force said piston into said cylinder, the diameter of said piston being slightly smaller than the inside diameter of the sealed end of said cylinder, whereby to force said fluid past said piston and out of said cylinder as the piston enters the cylinder, thus arresting movement of the car member.

3. In a catapult apparatus including a launching car member and a track member for the car, a snubbing device comprising a fluid-filled cylinder mounted on one of said members and having a frangible seal closing an open end thereof, a piston mounted on the other of said members and having a tapered free end extending toward said seal and adapted to pierce said seal when said car member reaches a predetermined point on said track member, continued movement of said car member acting to force said piston into said cylinder, the diameter of said piston being slightly smaller than the inside diameter of the sealed end of said cylinder, whereby to force said fluid past said piston and out of said cylinder as the piston enters the cylinder, thus arresting movement of the car member.

4. A snubbing device for use in a catapult apparatus, said snubbing device comprising, in combination, a fluid-filled cylinder having an axially aligned orifice at one end thereof, a frangible seal for said orifice, a piston in axial alignment with said cylinder adapted to pierce said seal and enter said orifice, said piston having a diameter less than said orifice, whereby said fluid is forced out of said orifice under great pressure and at a high velocity.

5. A snubbing device for use in a catapult apparatus, said snubbing device comprising a fluid-filled cylinder having an axially aligned orifice at one end thereof, a frangible seal for said orifice, a piston in axial alignment with said orifice and having a tapered end, said piston being adapted to pierce said seal and enter said orifice, said piston having a predetermined diameter sufficiently less than said orifice to permit the forceable escape of said fluid out of said orifice under constantly increasing pressure and velocity as the piston and cylinder are forced into telescopic relationship.

DAVID L. WEEKS.

REFERENCES CITED

The following references are of record in the file of this patent:

UNITED STATES PATENTS

| Number | Name | Date |
|---|---|---|
| 404,012 | Nickerson | May 28, 1889 |
| 1,532,630 | Methlin | Apr. 7, 1925 |
| 1,638,084 | Butler | Aug. 9, 1927 |
| 1,918,699 | Gruss | July 18, 1933 |

FOREIGN PATENTS

| Number | Country | Date |
|---|---|---|
| 508,625 | Germany | Sept. 30, 1930 |